J. J. Savage.

Heating Stove.

No. 2,895. Reissued Mar. 10, 1868.

Witnesses;
Austin S. Park
Wm. A. Greene

Inventor;
J. J. Savage

NORRIS PETERS, INC., LITHO., WASHINGTON, D. C.

United States Patent Office.

J. J. SAVAGE, OF TROY, NEW YORK.

*Letters Patent No.* 61,956, *dated February* 12, 1867; *reissue No.* 2,895, *dated March* 10, 1868.

DIVISION B.

IMPROVEMENT IN COAL-STOVES.

The Schedule referred to in these Letters Patent and making part of the same.

TO ALL WHOM IT MAY CONCERN:

Be it known that I, J. J. SAVAGE, of Troy, in the county of Rensselaer, and State of New York, have invented certain new and useful Improvements in Heating-Stoves or Heating-Furnaces. The object of this invention is to promote a better combustion of the gases evolved from burning bituminous fuels or coals; and I do hereby declare that the following is a full and exact description of the same, reference being had to the annexed drawings and the letters of reference marked thereon, making a part of this specification, in which—

The same letters refer to like parts in each of the said figures.

Figure 1:
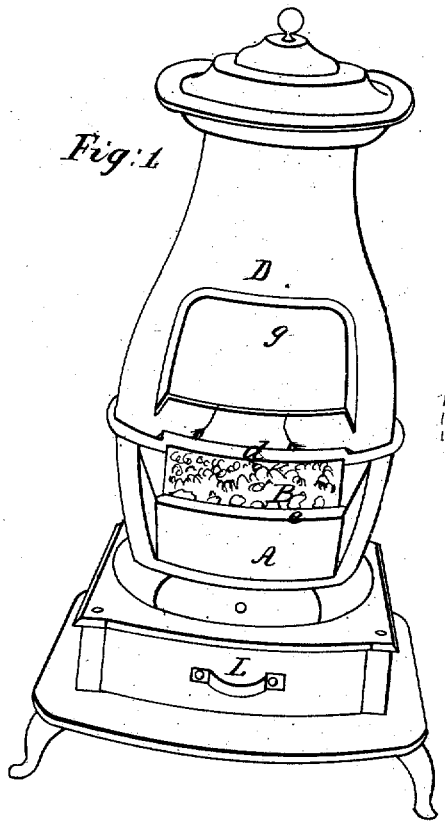
Figure 1 is a perspective view of my improved heating-stove.
Figure 2:
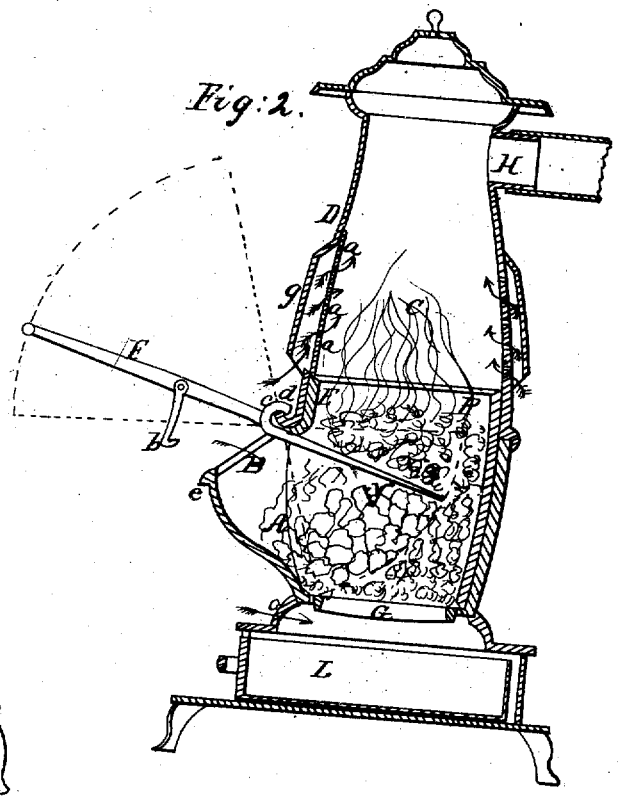
Figure 2 is a vertical sectional view of fig. 1, showing the manner of feeding fresh fuel into the fire-box of said stove.
Figure 3:
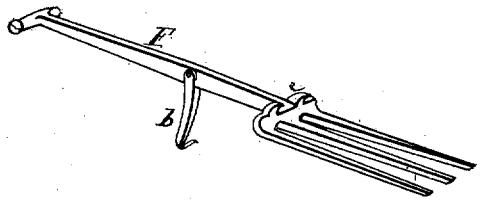
Figure 3 is a separate view of the lever lifter or feeder used with said stove.

The principle of operation of this improved heating-stove is to coke the fresh fuel or coals, to evolve the gases therefrom, by feeding the coals under and between the ignited coals in the fire-box thereof, in manner substantially as hereinafter fully described; and The said invention and improvements consist in so constructing a heating-stove or heating-furnace that its fuel-doorway or feed-aperture shall be in position below and forward of its flame or combustion-chamber, and contiguous to or adjoining its fire-box, in manner substantially and for the purposes as hereinafter fully set forth.

The said invention also, in combination with a heating-stove, having its fuel-aperture or doorway in position as above stated, consists in the construction and employment therewith of a lifter or feeder, in manner substantially and for the purposes as hereinafter fully described; and The said invention also, in combination with a heating-stove, its feed-aperture or doorway, and its fire-box-back lining-plates, consists in the arrangement of a front lining-plate in position between the flame or combustion-chamber and said feed-aperture, in manner substantially and for the purpose as hereinafter fully set forth.

By this invention an improved heating-stove or furnace is produced that admits of fresh fuel, such as bituminous coals and other fuels, being cast or fed directly into openings or vacant places made in, below, and between the ignited or burning coals in the fire-box thereof, in manner as hereinafter fully described; which manner of feeding fuel into the fire-box effects a better combustion of the gases evolved therefrom, thereby preventing the formation of fuliginous smoke, with its obstructive deposits of soot in the flues and exit-pipes of heating-stoves or furnaces, which would prevent a free draught and good operation of such stoves.

To enable others skilled in the art to make and use my said invention, I now proceed to fully describe the construction and operation of the same, in manner as follows, to wit:

I construct the furnace part of heating-stoves in such a manner that a part of the fire-box thereof shall project outwardly therefrom below the combustion or flame-chamber C, in manner substantially as shown at A, in the annexed drawings. In the top part of this projection is placed the feed-aperture or doorway B, through which fresh fuel is cast directly into the fire-box Y. The degree of projection of said part may be more or less, it being sufficient when it admits of a feed-aperture of proper dimensions to be placed therein, and prevents coals from falling out of the fire-box when renewing the fire with fresh fuel. The aforesaid fuel-doorway may be closed, either with sliding doors or a lid, as most convenient. At the upper edge of said feed-doorway there is made a fulcrum-ridge or bearing, *d*, extending the length of said doorway, and at the lower edge of said doorway there is made a catch-ridge, *e*, as shown. Arranged in combination with the back lining or fire-plates P, and in position between the aforesaid fuel-doorway or aperture, and the flame or combustion-chamber C, is a front lining or fire-plate, E, for the purpose of protecting that part of the front plate from intense heat of the fire. This plate is held in adjusted position by the other fire-plates, or it may be directly secured to the front plate by bolts, in such a manner as to be easily removed therefrom when worn out, and a new plate substituted therefor. Upon the front plate D of the flame-chamber there is made a bonnet or air-chamber, *g*, with large openings at its bottom part to admit air freely thereinto, and below or under this chamber attached to said front plate D, is a perforated draught-plate, which admits jets of air from said chamber, through apertures *a a a*, into the flame-chamber C, to mix with the heated gases rising therein, to produce a more perfect combustion of the same. A lever lifter or feeder F is employed in connection with the aforesaid feed-aperture or fuel-doorway, and it is constructed substantially with fulcrum-hooks *a*, by means of which it is hooked and held upon the aforesaid fulcrum-bearing or ridge *d*, in proper position to operate in the fire-box through the aforesaid feed-aperture of the stove. The fire or furnace-end of this lifting-lever is provided with tines or prongs to lift therewith the burning coals in the fire-box. A holding-hook, *b*, is also attached to it, for the purpose of hooking under or on the aforesaid catch-ridge *e*, thus holding the burning coals up in the fire-box while fresh coal or fuel is cast thereinto and thereunder. G is the fire-grate and L the ash-pit, which, together with all other parts and plates required for heating-stoves or furnaces, may be made in the usual or known manner.

The operation of this improved heating-stove or furnace is as follows: Fire is started in the usual way in the fire-box, with kindlings and coal. When the coal is fully ignited, or coked, it is lifted upward in the fire-box by hooking the aforesaid lifter-lever by its fulcrum-hook upon the fulcrum-ridge of the fuel-doorway, and then turning its handle end downward, in manner as shown by the dotted lines in the annexed drawings. This operation lifts upward a portion of burning coal in the fire-box, and forms thereby a vacant place between the burning coals therein. Into this space or place is directly cast the fresh coal or fuel, and when the place is thus filled, the lever-lifter is easily withdrawn from between the coals, and applied as before, until the fire-box is fully fed with fresh fuel.

By this peculiar manner of feeding fresh fuel, such as bituminous coals, into heating-stove fire-boxes, under and between ignited coals therein, the fresh coals remain undisturbed in such position until fully coked, and all combustible gases evolved therefrom while coking pass through the ignited coals lying above, and, in consequence thereof, enter the flame or combustion-chamber of the stove highly heated, and meeting and mixing therein with a proper supply of atmospheric air, the said gases readily ignite, and continue ignited until consumed, thus preventing the formation of fuliginous smoke, with its obstructive deposits of soot in the flues and exit-pipes of heating-stoves or furnaces.

What I claim as my invention, and desire to secure by Letters Patent, is—

1. I claim constructing a heating-stove, with its fuel-doorway or aperture B below and forward of its flame or combustion-chamber, and contiguous to or adjoining its fire-box A, in manner substantially as and for the purposes herein set forth.

2. I claim the combination of the fuel-doorway or aperture B and the fire-box A, extended contiguously thereunder, as applied to heating-stoves, in manner substantially as and for the purposes set forth.

3. I claim, in combination with a heating-stove having its fuel-doorway in the position as herein described, the employment therewith of a lifting-lever, F, substantially in manner as and for the purposes herein set forth.

4. I claim, in a heating-stove, in combination with its fire-box-back lining-plates and its fuel-doorway or aperture B, the arrangement of a front lining-plate, E, in position between the flame-chamber C and the said fuel-aperture, in manner substantially as and for the purpose set forth.

5. In combination with a lever lifter, F, as applied to heating-stoves, in manner as herein described, I claim the employment of a holding-hook, *b*, and catch-ridge *e*, substantially as and for the purpose set forth.

6. I claim a heating-stove so constructed that fresh fuel may be cast or fed directly into vacant room or open places previously formed or made for it in, below, and between the ignited fuel or coke within the fire-box of said stove, by the means and operation in manner substantially as hereinbefore fully described and shown, for the purposes as set forth.

J. J. SAVAGE.

Witnesses:

AUSTIN F. PARK,

WM. A. GREENE.